United States Patent
Rhee (10) Patent No.: US 7,245,168 B2
(45) Date of Patent: Jul. 17, 2007

(54) CLOCK SELECTION CIRCUIT AND DIGITAL PROCESSING SYSTEM FOR REDUCING GLITCHES

(75) Inventor: Young-chul Rhee, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 11/095,490

(22) Filed: Apr. 1, 2005

(65) Prior Publication Data

US 2005/0225361 A1    Oct. 13, 2005

(30) Foreign Application Priority Data

Apr. 12, 2004    (KR) ...................... 10-2004-0024889

(51) Int. Cl.
*G06F 1/04*    (2006.01)
*H03K 3/00*    (2006.01)

(52) U.S. Cl. .................................... 327/298

(58) Field of Classification Search .................. 327/99, 327/293–294, 298

See application file for complete search history.

(56) References Cited

U.S. PATENT DOCUMENTS

| 5,844,428 | A | 12/1998 | Jiang | 327/212 |
|---|---|---|---|---|
| 6,275,546 | B1 * | 8/2001 | Miller et al. | 375/354 |
| 6,535,048 | B1 * | 3/2003 | Klindworth | 327/407 |
| 2003/0145244 | A1 | 7/2003 | Muroor | 713/500 |
| 2003/0184347 | A1 | 10/2003 | Haroun | 327/99 |

FOREIGN PATENT DOCUMENTS

JP    6132821    5/1994

* cited by examiner

*Primary Examiner*—My-Trang Nu Ton
(74) *Attorney, Agent, or Firm*—Harness, Dickey & Pierce, P.L.C.

(57) ABSTRACT

A clock selection circuit and method may operate to generate a clock signal for a digital processing system. In the clock selection circuit, first and second clock control signals may be generated based on a received control signal and/or the inverse of a received clock signal. A first clock signal may be selected when the first clock control signal is activated, and may be output as the selected clock signal. A second clock signal may be selected when the second clock control signal is activated, and may be output as the selected clock signal. The selection operation of the clock selection circuit may reduce the likelihood that a glitch occurs and/or may reduce the amount of power consumed when compared to a conventional clock selection circuit.

36 Claims, 4 Drawing Sheets

CLOCK SELECTION CIRCUIT AND DIGITAL PROCESSING SYSTEM FOR REDUCING GLITCHES

BACKGROUND OF THE INVENTION

This application claims the priority of Korean Patent Application No. 2004-24889, filed on Apr. 12, 2004, in the Korean Intellectual Property Office, the disclosure of which is incorporated by reference herein in its entirety.

FIELD OF THE THE INVENTION

The present invention relates to a digital processing system which may include two or more clock signal sources, and more particularly, to a clock selection circuit that selects one clock signal from two or more clock signals and outputs the selected clock signal.

DESCRIPTION OF THE RELATED ART

For certain types of semiconductor circuits, speed and capacity has increased. Some examples of these types of semiconductor circuits may include, for example, application specific integrated circuits (ASIC), central processing units (CPU), and digital signal processors (DSP). Some of the progress in the speed and capacity of semiconductor circuits may be attributed to system-on-chip (SOC) integration, which may provide a way to integrate a plurality of separate chips into a single chip.

SOC may be integrated into a digital processing system having a plurality of clock signal sources. SOC may also enable a plurality of clock signals generated by a plurality of clock signal sources to be used selectively. A glitch may occur when changing clock signals from a first clock signal to a second clock signal. A clock selection circuit that receives more than one clock signal (i.e., a first and second clock signal), may select one of the two clock signals, and output the selected clock signal. Conventional clock selection circuits that perform clock selection operations may have a high level of power consumption, which may result from the amount of logic gates contained in the circuit. If a clock selection circuit performs a clock selection operation then certain measures may be taken to reduce the likelihood that a glitch occurs.

SUMMARY OF THE INVENTION

Exemplary embodiments of the present invention may provide a high-density and/or low power clock selection circuit.

Exemplary embodiments of the present invention may provide a clock selection circuit that reduces the likelihood of glitches when performing a clock selection operation and/or a clock selection circuit that uses fewer logic gates than conventional clock selection circuits, which may reduce the level of power consumption used by the clock selection circuit.

Exemplary embodiments of the present invention may further provide a digital processing system that includes a clock selection circuit.

According to an exemplary embodiment of the present invention a clock selection circuit may receive first and second clock signals, and select and output one of the clock signals. The clock selection circuit may include a first control circuit, a second control circuit, a first disable signal generating circuit, a second disable signal generating circuit, and a logic circuit. The first control circuit may generate a first clock control signal activated for a first specified period, and may output a delayed first clock signal as a first gated clock signal in response to a control signal and/or a first disable signal. The second control circuit may generate a second clock control signal activated for a second specified period, and output a delayed second clock signal as a second gated clock signal in response to an inverted control signal and/or a second disable signal. The first disable signal generating circuit may generate the first disable signal by delaying the second clock control signal for a specified cycle of the delayed first clock signal. The second disable signal generating circuit may generate the second disable signal by delaying the first clock control signal for a specified cycle of the delayed second clock signal. The logic circuit may generate an output clock signal by performing a logic operation on the first and second gated clock signals.

Exemplary embodiments of the present invention may provide the first control circuit generating the first clock control signal activated for a first specified period, and may output a delayed first clock signal as a first gated clock signal during only the first specified period in response to a control signal and/or a first disable signal. The second control circuit may generate a second clock control signal activated for a second specified period, and may output a delayed second clock signal as a second gated clock signal during only the second specified period in response to an inverted control signal and/or a second disable signal.

Exemplary embodiments of the present invention may also provide the first control circuit including a first clock control circuit, a first delay circuit, and a first gating circuit. The first clock control circuit may generate the first clock control signal activated during the first specified period in response to the control signal and/or the first disable signal. The first delay circuit may output the delayed first clock signal by delaying the first clock signal. If the first gating circuit outputs the delayed first clock signal as the first gated clock signal then this output operation may occur during the first specified period of the first clock control signal.

Exemplary embodiments of the present invention may also provide the second control circuit including a second clock control circuit, a second delay circuit, and a second gating circuit. The second clock control circuit may generate the second clock control signal activated during the second specified period in response to the inverted control signal and/or the second disable signal. The second delay circuit may output the delayed second clock signal by delaying the second clock signal. If the second gating circuit outputs the delayed second clock signal as the second gated clock signal then this output operation may occur during the second specified period of the second clock control signal.

Exemplary embodiments of the present invention may also provide the first disable signal generating circuit including a plurality of flip-flops connected in series, the flip-flops each having a clock port into which the delayed first clock signal may be input. Among the plurality of flip-flops in the first disable generating circuit, a second clock control signal may be input to the first flip-flop, and/or the first disable signal may be output from the last flip-flop.

Exemplary embodiments of the present invention may also provide the second disable signal generating circuit including a plurality of flip-flops connected in series, the flip-flops each having a clock port into which the delayed second clock signal may be input. Among the plurality of flip-flops in the second disable generating circuit, a first clock control signal may be input to the first flip-flop, and a second disable signal may be output from the last flip-flop.

Exemplary embodiments of the present invention may also provide the logic circuit including a NAND gate that receives the first and second gated clock signals and outputs the output clock signal.

According to another exemplary embodiment of the present invention a digital processing system may include a digital processing circuit, a first clock signal source, a second clock signal source and a clock selection circuit. The digital processing circuit may operate at a plurality of clock frequencies. The first clock signal source may generate a first clock signal, and the second clock signal source generate a second clock signal. The clock selection circuit may receive and select one of the first and second clock signals, and output the selected clock signal to the digital processing circuit.

Exemplary embodiments of the present invention may provide the first control circuit of the digital processing system generating the first clock control signal activated for a first specified period, and may output a delayed first clock signal as a first gated clock signal during only the first specified period in response to a control signal and/or a first disable signal. The second control circuit may generate a second clock control signal activated for a second specified period, and may output a delayed second clock signal as a second gated clock signal during only the second specified period in response to an inverted control signal and/or a second disable signal.

Exemplary embodiments of the present invention may provide the clock selection circuit of the digital processing system including a first control circuit, a second control circuit, a first disable signal generating circuit, a second disable signal generating circuit, and a logic circuit. The first control circuit may generate a first clock control signal activated for a first specified period, and may output a delayed first clock signal as a first gated clock signal in response to a control signal and/or a first disable signal. The second control circuit may generate a second clock control signal activated for a second specified period, and output a delayed second clock signal as a second gated clock signal in response to an inverted control signal and/or a second disable signal. The first disable signal generating circuit may generate the first disable signal by delaying the second clock control signal for a specified cycle of the delayed first clock signal. The second disable signal generating circuit may generate the second disable signal by delaying the first clock control signal for a specified cycle of the delayed second clock signal. The logic circuit may generate an output clock signal by performing a logic operation on the first and second gated clock signals.

Exemplary embodiments of the present invention may provide the first control circuit of the digital processing system including a first clock control circuit, a first delay circuit, and a first gating circuit. The first clock control circuit may generate the first clock control signal activated during the first specified period in response to the control signal and/or the first disable signal. The first delay circuit may output the delayed first clock signal by delaying the first clock signal. The first gating circuit may output the delayed first clock signal as the first gated clock signal during the first specified period of the first clock control signal.

Exemplary embodiments of the present invention may provide the second control circuit of the digital processing system including a second clock control circuit, a second delay circuit, and a second gating circuit. The second clock control circuit may generate the second clock control signal activated during the second specified period in response to the inverted control signal and/or the second disable signal.

The second delay circuit may output the delayed second clock signal by delaying the second clock signal. The second gating circuit may output the delayed second clock signal as the second gated clock signal during the second specified period of the second clock control signal.

Exemplary embodiments of the present invention may also provide the first disable signal generating circuit of the digital processing system including a plurality of flip-flops connected in series, the flip-flops each having a clock port into which the delayed first clock signal may be input. Among the plurality of flip-flops in the first disable generating circuit, a second clock control signal may be input to the first flip-flop, and/or the first disable signal may be output from the last flip-flop.

Exemplary embodiments of the present invention may also provide the second disable signal generating circuit of the digital processing system including a plurality of flip-flops connected in series, the flip-flops each having a clock port into which the delayed second clock signal may be input. Among the plurality of flip-flops in the second disable generating circuit, a first clock control signal may be input to the first flip-flop, and a second disable signal may be output from the last flip-flop.

Exemplary embodiments of the present invention may also provide the logic circuit of the digital processing system including a NAND gate that receives the first and second gated clock signals and outputs the output clock signal.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE
EXEMPLARY EMBODIMENTS OF THE
PRESENT INVENTION

Hereinafter, the present invention will be described in detail by explaining exemplary embodiments of the invention with reference to the attached drawings. Like reference numerals in the drawings may represent like elements.

Figure 1:
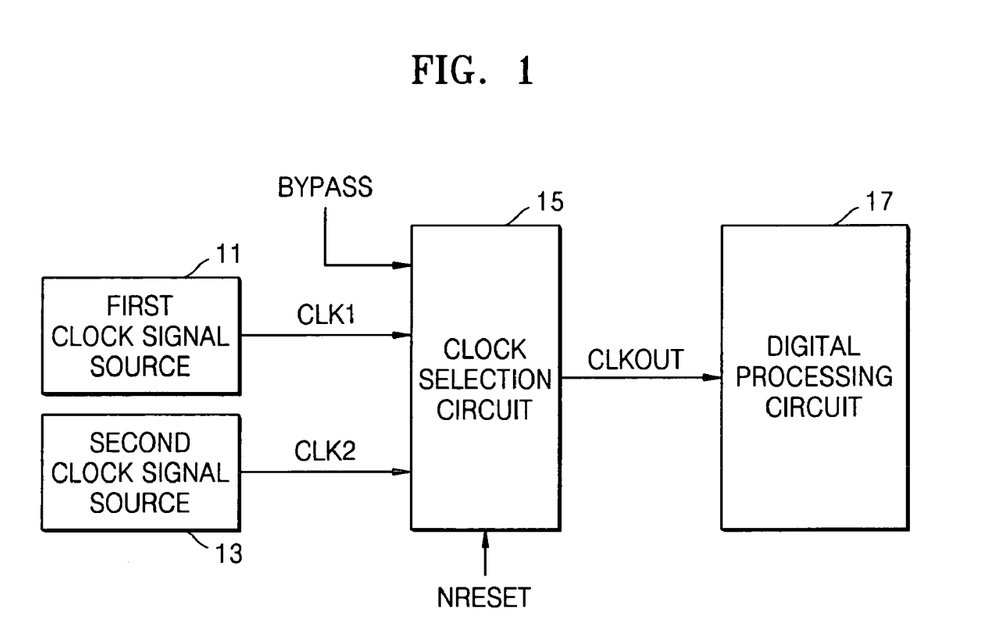
FIG. 1 illustrates a block diagram of a digital processing system according to an exemplary embodiment of the present invention.

FIG. 1 is a block diagram of a digital processing system according to an exemplary embodiment of the present invention. Referring to FIG. 1, the digital processing system may include a first clock signal source 11, a second clock signal source 13, a clock selection circuit 15 and a digital processing circuit 17.

The first clock signal source 11 may generate a first clock signal CLK1, and the second clock signal source 13 may generate a second clock signal CLK2. The first and second clock signal sources may be internal or external clock signal sources.

The clock selection circuit 15, according to an exemplary embodiment of the present invention, may select one of the first and second clock signals CLK1 and CLK2 as an output clock signal CLKOUT. Selecting an output clock signal CLKOUT may be performed in response to a control signal BYPASS received by the clock selection circuit from an external source. If the clock selection circuit performs a selection operation by selecting one of the clock signals CLK1 and CLK2 then the output clock signal CLKOUT may be output to the digital processing circuit 17.

The digital processing circuit 17 may operate with more than one clock frequency. For example, the digital processing circuit 17 may operate in response to the first clock signal CLK1 and/or the second clock signal CLK2. The digital processing circuit 17 may include an application specific integrated circuit (ASIC), a central processing unit (CPU), and/or a digital signal processor (DSP).

The first clock signal CLK1 and the second clock signal CLK2 may be synchronous or asynchronous clock signals. Also, the first clock signal CLK1 and the second clock signal CLK2 may operate at the same or different clock frequencies.

The control signal BYPASS may be an active high signal that controls the first clock signal CLK1 and the second clock signal CLK2, which may be selectively output to the output clock signal CLKOUT port of the clock selection circuit 15. A reset signal NRESET may be an active low signal and may provided as input to the clock selection circuit 15.

Figure 2:
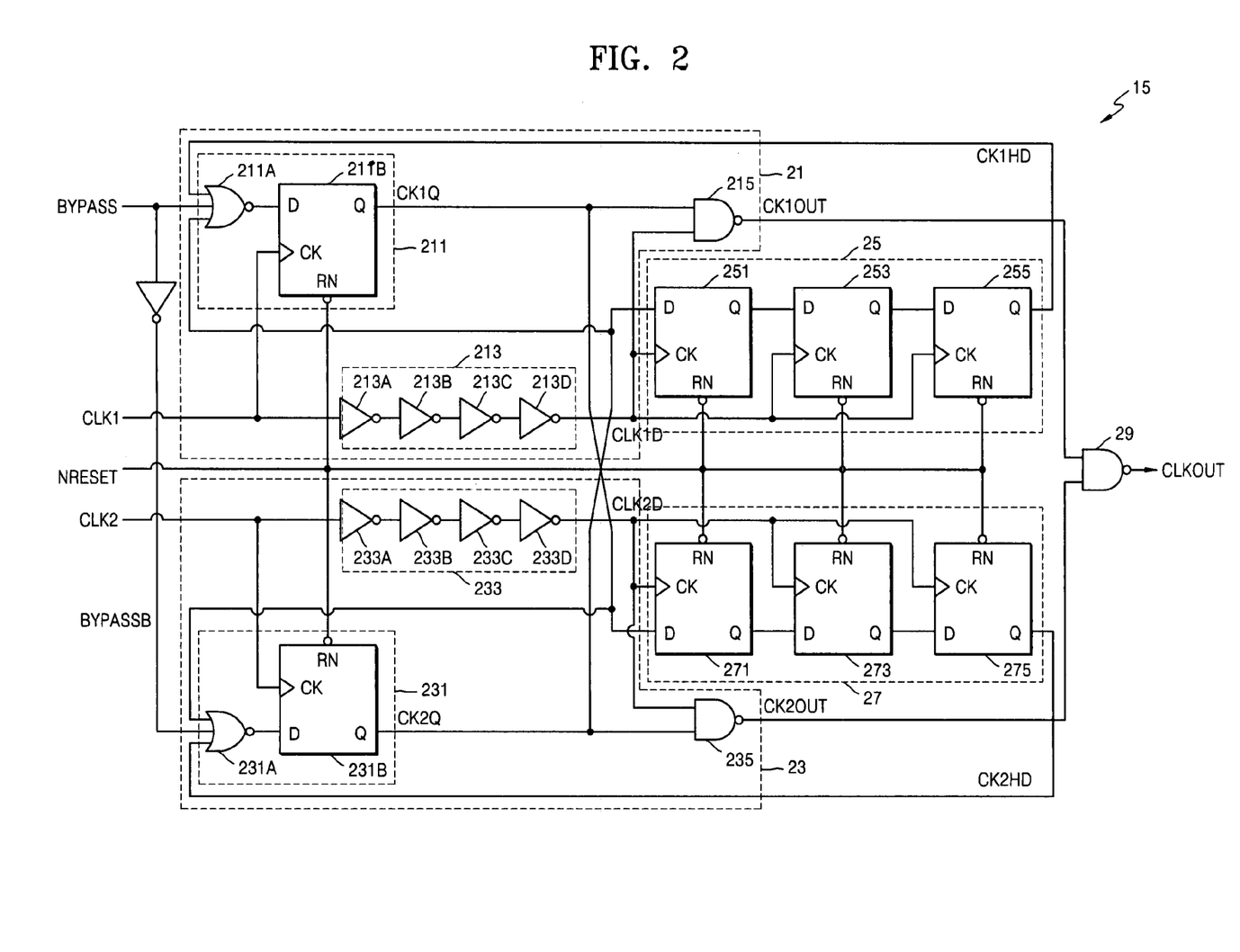
FIG. 2 illustrates a circuit diagram of a clock selection circuit of FIG. 1 according to an exemplary embodiment of the present invention.

FIG. 2 is a circuit diagram of the clock selection circuit 15 of FIG. 1, according to an exemplary embodiment of the present invention. Referring to FIG. 2, the clock selection circuit 15 may include, for example, a first control circuit 21, a second control circuit 23, a first disable signal generating circuit 25, a second disable signal generating circuit 27, and a logic circuit 29.

The first control circuit 21, according to an exemplary embodiment of the present invention, may generate a first clock control signal CK1Q in response to the control signal BYPASS, a first disable signal CK1HD, a first clock signal and/or a second clock control signal from the second control circuit 23. The first clock control signal CK1Q may be activated for a specified period. The first control circuit 21 may output a delayed clock signal CLK1D based on a delayed first clock signal CLK1. The delayed clock signal CLK1D and the first clock control signal CK1Q may be used to generate a first gated clock signal CK1OUT during the specified period.

The second control circuit 23, according to an exemplary embodiment of the present invention, may generate a second clock control signal CK2Q in response to the control signal BYPASSB (inverted BYPASS), a second disable signal CK2HD, a second clock signal and/or a first clock control signal from the first control circuit 21. The second clock control signal CK2Q may be activated for a specified period. The second control circuit 23 may output a delay clock signal CLK2D based on a delayed second clock signal CLK2. The delayed clock signal CLK2D may be used to generate a second gated clock signal CK2OUT during the specified period.

The first disable signal generating circuit 25, according to an exemplary embodiment of the present invention, may generate the first disable signal CK1HD. Generating the first disable signal CK1HD may include delaying the second clock control signal CK2Q, which may be input to the first disable signal generating circuit. The second clock control signal CK2Q may be delayed by a cycle of the delay clock signal CLK1D. The second disable signal generating circuit 27 may generate the second disable signal CK2HD. Generating the second disable signal CK2D may include delaying the first clock control signal CK1Q, which may be input to the second disable signal generating circuit. The first clock control signal CK1Q may be delayed by a cycle of the delay clock signal CLK2D.

The first control circuit 21, according to an exemplary embodiment of the present invention, may include for example, a first clock control circuit 211, a first delay circuit 213, and a first gating circuit 215.

The first clock control circuit 211, according to an exemplary embodiment of the present invention, may receive the control signal BYPASS, the first disable signal CK1HD, the first clock signal CLK1 and/or the second clock control signal CK2Q from the second clock control circuit 231. The first clock control circuit 211 may generate the first clock control signal CK1Q, which may be activated during a specified period. The first clock control circuit 211 may include a NOR gate 211A for receiving input signals, and may also include a flip-flop 211B for receiving an output signal of the NOR gate 211A. The flip-flop 211B may receive the output of NOR gate 211A, the clock signal CLK1 and/or a reset signal NRESET at a reset port RN. The flip-flop 211B may output the first clock control signal CK1Q.

The first delay circuit 213 may delay the first clock signal CLK1 and/or output the delay signal CLK1D. The first delay circuit 213 may be composed of a series chain of inverters, which may be an even number of inverters, for example 213A through 213D of FIG. 2.

The first gating circuit 215 may be composed of a NAND gate that receives the first clock control signal CK1Q and the delay signal CLK1D and outputs the first gated clock signal CK1OUT. The first gated clock signal CK1OUT may be activated when the first clock control signal CK1Q is activated.

The second control circuit 23, according to an exemplary embodiment of the present invention, may include for example, a second clock control circuit 231, a second delay circuit 233, and a second gating circuit 235.

The second clock control circuit 231, according to an exemplary embodiment of the present invention, may receive the control signal BYPASSB (inverted BYBASS), the second disable signal CK2HD, the second clock signal CLK2 and/or the first clock control signal from the first clock control circuit 211. The second clock control circuit 231 may generate the second clock control signal CK2Q, which may be activated during a specified period. The second clock control circuit 231 may include a NOR gate 211A for receiving input signals, and may also include a flip-flop 231B for receiving an output signal of the NOR gate 231A. The flip-flop 231B may receive the output of NOR gate 231A, the clock signal CLK1 and/or a reset signal NRESET at a reset port RN. The flip-flop 231B may output the second clock control signal CK2Q.

The second delay circuit 233 may delay the second clock signal CLK2 and/or output the delay signal CLK2D. The second delay circuit 233 may be composed of a series chain of inverters, which may be an even number of inverters, for example inverters 233A through 233D.

The second gating circuit 235 may be composed of a NAND gate that receives the second clock control signal CK2Q and the delay signal CLK2D and outputs the second gated clock signal CK2OUT. The second gated clock signal CK2OUT may be activated when the second clock control signal CK2Q is activated.

The first disable circuit 25, according to an exemplary embodiment of the present invention, may include a plurality of flip-flops connected in series, for example 251, 253, and 255. The delay signal CLK1D may be input to one or more of the clock ports CK of the plurality of flip-flops. The second clock control signal CK2Q may be input to an input port D of a first flip-flop 251 among the plurality of flip-flops. The output ports Q for the first and second flip-flops (i.e., 251 and 253) may be coupled to the input ports D of the second and third flip-flops (i.e., 253 and 255) respectively. The first disable signal CK1HD may be output from an output port Q of the last flip-flop 255 among the plurality of flip-flops 251, 253, and 255 of the first disable circuit 25. Also, a reset signal NRESET may be input to reset ports RN for all of the flip-flops of the first disable circuit 25.

The second disable circuit 27, according to an exemplary embodiment of the present invention, may include a plurality of flip-flops connected in series, for example 271, 273, and 275. The delay signal CLK2D may be input to one or more of the clock ports CK of the plurality of flip-flops. The first clock control signal CK1Q may be input to an input port D of a first flip-flop 271 among the plurality of flip-flops. The output ports Q for the first and second flip-flops may be coupled to the input ports D of the second and third flip-flops respectively. The second disable signal CK2HD may be output from an output port Q of the last flip-flop 275 among the plurality of flip-flops 271, 273, and 275 of the second disable circuit 27. Also, a reset signal NRESET may be input to reset ports RN for all of the flip-flops of the second disable circuit 27.

The first and second disable circuits 25 and 27, according to an exemplary embodiment of FIG. 2, have each been illustrated as having three flip-flops. Other examples of disable signal generating circuits, which may be used in the clock selection circuit 15 may include, for example, two, four, or more than four flip-flops.

The logic circuit 29 may be a NAND gate that receives the first gated clock signal CK1OUT and the second gated clock signal CK2OUT and outputs the output clock signal CLKOUT.

Figure 3:
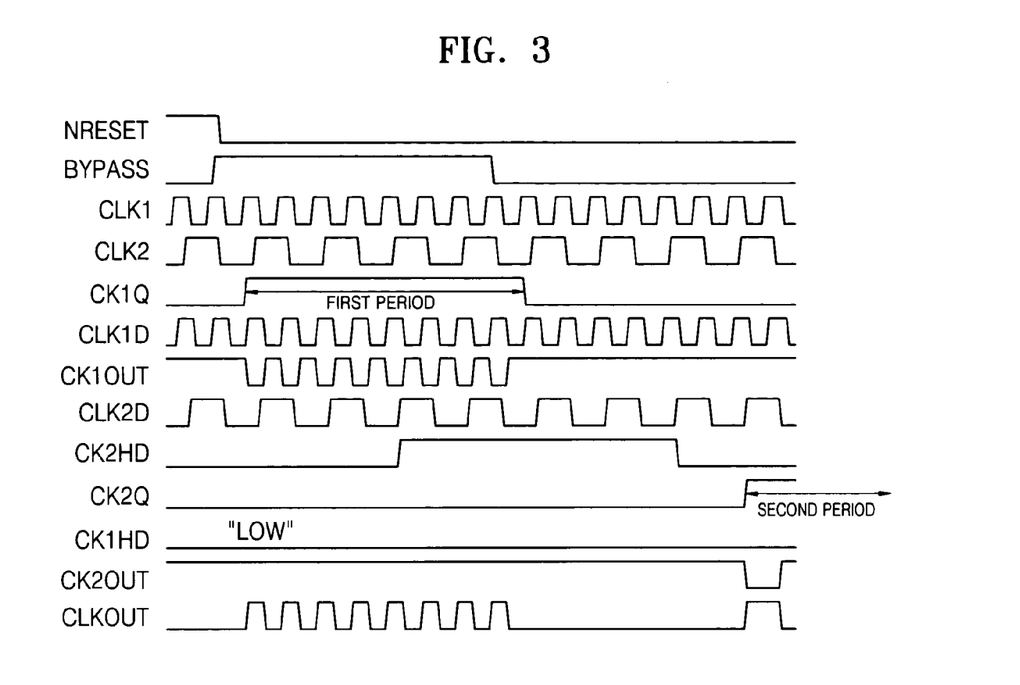
FIG. 3 illustrates a timing diagram of the clock selection circuit illustrated in FIG. 2.

FIG. 3, according to an exemplary embodiment of the present invention, illustrates a timing diagram of the signals of clock selection circuit 15. Referring to FIG. 3, the first clock control signal CK1Q, the second clock control signal CK2Q, the first disable signal CK1HD, and the second disable signal CK2HD may all be initially at a logic low state in response to logic high state of reset signal NRESET.

The first clock control signal CK1Q, according to an example operation of the first clock control circuit 211, may be activated to a logic high state once the control signal BYPASS has been activated by the first clock control circuit 21. CK1Q may be activated to a logic high state after a time duration of one cycle of the first clock signal CLK1, after the control signal BYPASS has been activated. The first clock control signal CK1Q may be activated to a logic high state, for example, for a first specified period, which may correspond to a period when the control signal BYPASS is at a logic high state.

The first gating circuit 215 may invert the delay signal CLK1D for a specified time period, for example, only during a time period when the first clock control signal CK1Q is at a logic high state. The inverted signal may be output as the first gated clock signal CK1OUT.

The second clock control signal CK2Q, according to an example operation of the second clock control circuit 231, may be activated to a logic high state during a specified period, for example, a second specified period, which may correspond to a time period when the control signal BYPASSB (not included in FIG. 3) is at a logic high state.

The second gating circuit 235 may invert the delay signal CLK2D for a specified time period, for example, only during a time period when the second clock control signal CK2Q is at a logic high state. The inverted signal may be output as the second gated clock signal CK2OUT.

Logic circuit 29, according to an exemplary embodiment of FIG. 2, may perform a NAND operation on the first and second gated clock signals CK1OUT and CK2OUT, and output a clock signal CLKOUT. The first clock signal CLK1 may be selected and output as the output clock signal CLKOUT only during a specified time period when the first clock control signal CK1Q is at a logic high state. Also the second clock signal CLK2 may be selected and output as the output clock signal CLKOUT only during a specified time period when the second clock control signal CK2Q is at a logic high state. Limiting the time periods when a specified clock signal may be output to a digital processing circuit may reduce the likelihood that glitches occur.

Figure 4:
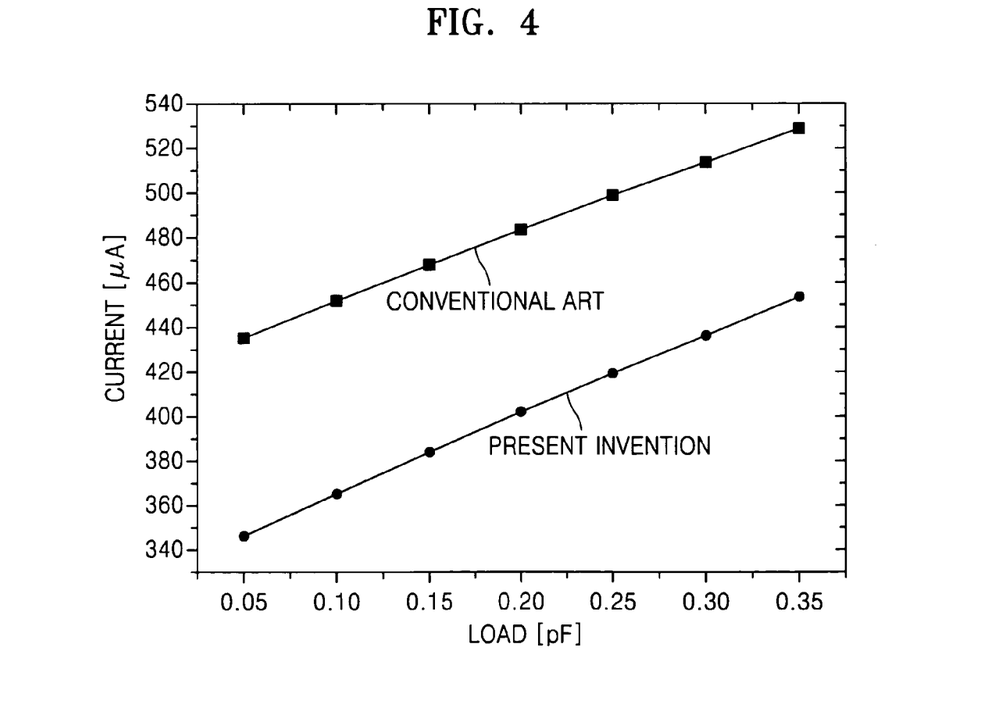
FIG. 4 is a graph illustrating an example simulation comparing power consumption of the clock selection circuit illustrated in FIG. 2 and power consumption of a conventional clock selection circuit.

FIG. 4 is a graph representing a comparison between an exemplary embodiment of the present invention and a conventional clock selection circuit. The simulation result illustrates a comparison between the power consumption of the clock selection circuit 15 of the present invention and the power consumption of a conventional clock selection circuit. The clock selection circuit 15 may use less power than the conventional clock selection circuit. Also, the number of logic gates used in the clock selection circuit 15 is about 20% less than the number of logic gates used in the conventional clock selection circuit.

Figure 5:
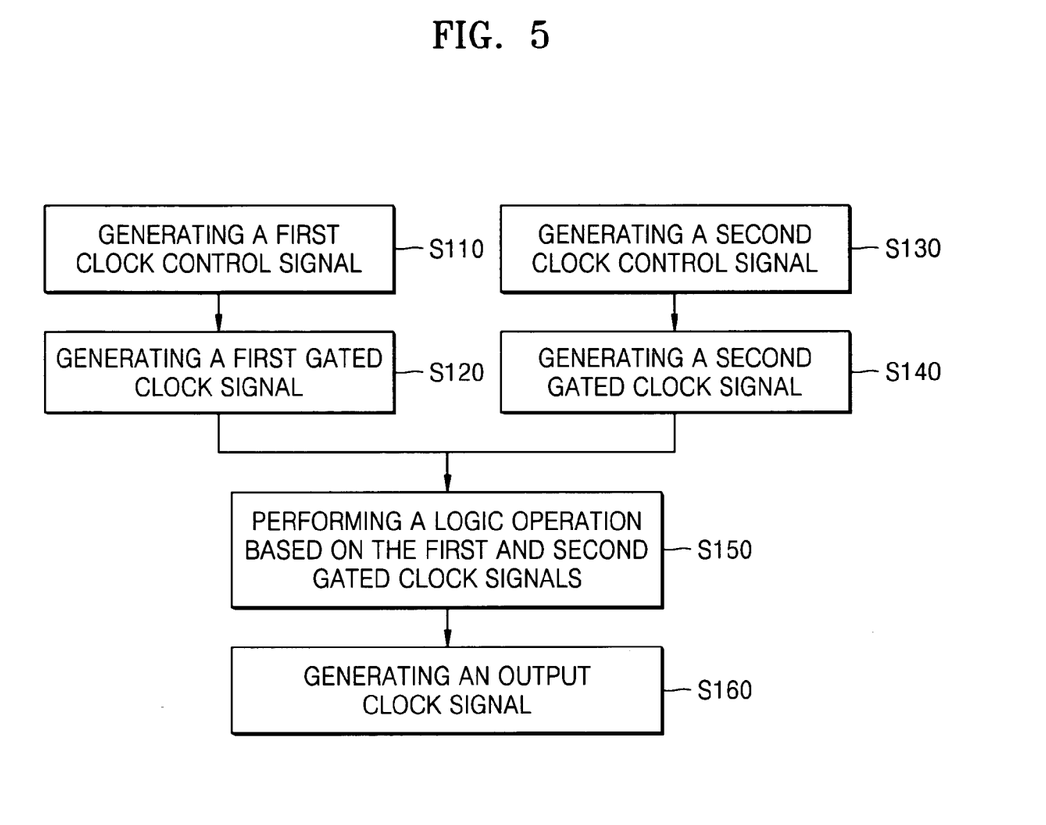
FIG. 5 is a flow diagram illustrating an example operation of the clock selection circuit according to an exemplary embodiment of the present invention.

FIG. 5, according to an exemplary embodiment of the present invention, illustrates an operation of selecting and generating a clock signal, which may be output to a digital processing circuit. Referring to FIG. 5, a first and second clock control signal are generated S110 and S130, and a first and second gated clock signal are generated S120 and S140. A logic operation may be performed based on the first and second gated clock signals S150 and as a result an output clock signal may be generated S160.

Exemplary embodiments of the present invention have been shown and described with reference to two clock signal sources 11 and 13, and correspondingly two sets of circuit components (i.e., 211 and 231, 213 and 233, 21 and 23, 25 and 27) as illustrated in the clock selection circuit 15. It will be understood by those of ordinary skill in the art that exemplary embodiments of the present invention may include more than two clock signal sources and/or more than two corresponding sets of circuit components for a clock selection circuit.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A clock selection circuit that receives first and second clock signals, and selects and outputs one of the clock signals, the clock selection circuit comprising:
   a first control circuit that generates a first clock control signal activated for a first specified period, and outputs a first gated clock signal based on a delayed first clock signal during the first specified period in response to at least one of a control signal and a first disable signal;

a second control circuit that generates a second clock control signal activated for a second specified period, and outputs a second gated clock signal based on a delayed second clock signal during the second specified period in response to at least one of the inverted control signal and a second disable signal;

a first disable signal generating circuit that generates the first disable signal by delaying the second clock control signal for a specified cycle duration of the delayed first clock signal;

a second disable signal generating circuit that generates the second disable signal by delaying the first clock control signal for a specified cycle duration of the delayed second clock signal; and a logic circuit that generates an output clock signal by performing a logic operation on the first and second gated clock signals.

2. The clock selection circuit of claim 1, wherein the first control circuit comprises:

a first clock control circuit that generates the first clock control signal in response to the control signal and the first disable signal, wherein said first clock control signal is activated during the first specified period;

a first delay circuit that delays the first clock signal and outputs the delayed first clock signal; and a first gating circuit that outputs the delayed first clock signal as the first gated clock signal during the first specified period of the first clock control signal.

3. The clock selection circuit of claim 2, wherein the first clock control circuit comprises:

a NOR gate that receives the control signal, the first disable signal, and the second clock control signal; and a flip-flop that receives an output signal of the NOR gate and outputs the first clock control signal.

4. The clock selection circuit of claim 2, wherein the first gating circuit comprises a NAND gate that receives the first clock control signal and the delayed first clock signal and outputs the first gated clock signal.

5. The clock selection circuit of claim 1, wherein the second control circuit comprises:

a second clock control circuit that generates the second clock control signal in response to the inverted control signal and the second disable signal, wherein said second clock control signal is activated during the second specified period;

a second delay circuit that delays the second clock signal and outputs the delayed second clock signal; and a second gating circuit that outputs the delayed second clock signal as the second gated clock signal during the second specified period of the second clock control signal.

6. The clock selection circuit of claim 5, wherein the second clock control circuit comprises:

a NOR gate that receives the inverted control signal, the second disable signal, and the first clock control signal; and a flip-flop that receives an output signal of the NOR gate and outputs the second clock control signal.

7. The clock selection circuit of claim 5, wherein the second gating circuit comprises a NAND gate that receives the second clock control signal and the delayed second clock signal, and outputs the second gated clock signal.

8. The clock selection circuit of claim 1, wherein the first disable signal generating circuit comprises a plurality of flip-flops connected in series, the flip-flops each having a clock port for receiving the delayed first clock signal as input, wherein the second clock control signal is input to a first flip-flop among the plurality of flip-flops, and the first disable signal is output from a last flip-flop among the plurality of flip-flops.

9. The clock selection circuit of claim 1, wherein the second disable signal generating circuit comprises a plurality of flip-flops connected in series, the flip-flops each having a clock port for receiving the delayed second clock signal as input, the first clock control signal is input to a first flip-flop among the plurality of flip-flops, and the second disable signal is output from a last flip-flop among the plurality of flip-flops.

10. The clock selection circuit of claim 1, wherein the logic circuit comprises a NAND gate that receives the first and second gated clock signals and outputs the output clock signal.

11. The clock selection circuit of claim 1, wherein the first control circuit outputs the first gated clock signal only during the first specified period, and wherein the second control circuit outputs the second gated clock signal only during the second specified period.

12. A clock selection circuit that receives first and second clock signals, and selects and outputs one of the clock signals, the clock selection circuit comprising:

a first clock control circuit that generates a first clock control signal having a first activation section of a specified length, said first clock control signal being generated in response to at least one of a control signal and a first disable signal;

a first delay circuit that delays the first clock signal and outputs a delayed first clock signal;

a first gating circuit that outputs the delayed first clock signal as a first gated clock signal during the first activation section of the first clock control signal;

a second clock control circuit that generates a second clock control signal having a second activation section of a specified length, said second clock control signal being generated in response to at least one of the control signal inverted and a second disable signal;

a second delay circuit that delays the second clock signal and outputs a delayed second clock signal;

a second gating circuit that outputs the delayed second clock signal as a second gated clock signal during the second activation section of the second clock control signal;

a first disable signal generating circuit that generates the first disable signal by delaying the second clock control signal for a specified cycle duration of the delayed first clock signal, said first disable signal being generated in response to the delayed first clock signal;

a second disable signal generating circuit that generates the second disable signal by delaying the first clock control signal for a specified cycle duration of the delayed second clock signal, said second disable signal being generated in response to the delayed second clock signal; and a logic circuit that generates an output clock signal by performing a logic operation on the first and second gated clock signals.

13. The clock selection circuit of claim 12, wherein the first clock control circuit comprises:

an NOR gate that receives the control signal, the first disable signal, and the second clock control signal; and a flip-flop that receives an output signal of the NOR gate and outputs the first clock control signal.

14. The clock selection circuit of claim 12, wherein the first gating circuit comprises a NAND gate that receives the first clock control signal and the delayed first clock signal and outputs the first gated clock signal.

15. The clock selection circuit of claim 12, wherein the second clock control circuit comprises:
 an NOR gate that receives the inverted control signal, the second disable signal, and the first clock control signal; and
 a flip-flop that receives an output signal of the NOR gate and outputs the second clock control signal.

16. The clock selection circuit of claim 12, wherein the second gating circuit comprises a NAND gate that receives the second clock control signal and the delayed second clock signal and outputs the second gated clock signal.

17. The clock selection circuit of claim 12, wherein the first disable signal generating circuit comprises a plurality of flip-flops connected in series, the flip-flops each having a clock port for receiving the delayed first clock signal, wherein the second clock control signal is input to a first flip-flop among the plurality of flip-flops, and the first disable signal is output from a last flip-flop among the plurality of flip-flops.

18. The clock selection circuit of claim 12, wherein the second disable signal generating circuit comprises a plurality of flip-flops connected in series, the flip-flops each having a clock port for receiving the delayed second clock signal, wherein the first clock control signal is input to a first flip-flop among the plurality of flip-flops, and the second disable signal is output from a last flip-flop among the plurality of flip-flops.

19. The clock selection circuit of claim 12, wherein the logic circuit comprises a NAND gate that receives the first and second gated clock signals and outputs the output clock signal.

20. A digital processing system, comprising:
 a first clock signal source;
 a second clock signal source;
 a digital processing circuit operating with at least one of the clock frequencies of said first clock signal source and said second clock signal source; and
 a clock selection circuit receiving first and second clock signals from the first and second clock signal sources respectively, selecting one of the clock signals, and outputting the selected clock signal to the digital processing circuit, wherein the clock selection circuit comprises,
 a first control circuit that generates a first clock control signal activated for a first specified period, and outputs a first gated clock signal based on a delayed first clock signal during the first specified period in response to at least one of a control signal and a first disable signal;
 a second control circuit that generates a second clock control signal activated for a second specified period, and outputs a second gated clock signal based on a delayed second clock signal, during the second specified period in response to at least one of the control signal inverted and a second disable signal;
 a first disable signal generating circuit that generates the first disable signal by delaying the second clock control signal for a specified cycle duration of the delayed first clock signal;
 a second disable signal generating circuit that generates the second disable signal by delaying the first clock control signal for a specified cycle duration of the delayed second clock signal; and
 a logic circuit that generates an output clock signal by performing a logic operation on the first and second gated clock signals.

21. The digital processing system of claim 20, wherein the first control circuit comprises:
 a first clock control circuit that generates the first clock control signal in response to the control signal and the first disable signal, wherein said first clock control signal is activated during the first specified period;
 a first delay circuit that delays the first clock signal and outputs the delayed first clock signal; and
 a first gating circuit that outputs the delayed first clock signal as the first gated clock signal during the first specified period of the first clock control signal.

22. The digital processing system of claim 21, wherein the first clock control circuit comprises:
 an NOR gate that receives the control signal, the first disable signal, and the second clock control signal; and
 a flip-flop that receives an output signal of the NOR gate and outputs the first clock control signal.

23. The digital processing system of claim 21, wherein the first gating circuit comprises a NAND gate that receives the first clock control signal and the delayed first clock signal and outputs the first gated clock signal.

24. The digital processing system of claim 20, wherein the second control circuit comprises:
 a second clock control circuit that generates the second clock control signal in response to the inverted control signal and the second disable signal, wherein said second clock control signal is activated during the second specified period;
 a second delay circuit that delays the second clock signal and outputs the delayed second clock signal; and
 a second gating circuit that outputs the delayed second clock signal as the second gated clock signal during the second specified period of the second clock control signal.

25. The digital processing system of claim 24, wherein the second clock control circuit comprises:
 an NOR gate that receives the inverted control signal, the second disable signal, and the first clock control signal; and
 a flip-flop that receives an output signal of the NOR gate and outputs the second clock control signal in response to the second clock signal.

26. The digital processing system of claim 24, wherein the second gating circuit comprises a NAND gate that receives the second clock control signal and the delayed second clock signal, and outputs the second gated clock signal.

27. The digital processing system of claim 20, wherein the first disable signal generating circuit comprises a plurality of flip-flops connected in series, the flip-flops each having a clock port into which the delayed first clock signal is input, the second clock control signal is input to a first flip-flop among the plurality of flip-flops, and the first disable signal is output from a last flip-flop among the plurality of flip-flops.

28. The digital processing system of claim 20, wherein the second disable signal generating circuit comprises a plurality of flip-flops connected in series, the flip-flops each having a clock port into which the delayed second clock signal is input, the first clock control signal is input to a first flip-flop among the plurality of flip-flops, and the second disable signal is output from a last flip-flop among the plurality of flip-flops.

29. The digital processing system of claim 20, wherein the logic circuit comprises a NAND gate that receives the first and second gated clock signals and outputs the output clock signal.

30. The clock selection circuit of claim 19, wherein the first control circuit outputs the first gated clock signal only during the first specified period, and wherein the second control circuit outputs the second gated clock signal only during the second specified period.

31. A clock selection circuit comprising:
a first control circuit that generates a first clock control signal based on a control signal and at least one of a first disable signal, a first clock signal and a second clock control signal, and wherein said first control circuit generates a first gated clock signal based on the first clock control signal and a delayed first clock signal, the delayed first clock signal not being used as the clock signal for any flip-flop of the first control circuit;
a second control circuit that generates the second clock control signal based on the control signal inverted and at least one of a second disable signal, a second clock signal and the first clock control signal, and wherein said second control circuit generates a second gated clock signal based on the second clock control signal and a delayed second clock signal, the delayed second clock signal not being used as the clock signal for any flip-flop of the second control circuit; and
a logic circuit that generates an output clock signal by performing a logic operation on the first and second gated clock signals.

32. The clock selection circuit of claim 31, wherein said logic circuit includes a NAND gate.

33. The clock selection circuit of claim 31, further comprising:
a first disable signal generating circuit that generates the first disable signal by delaying the second clock control signal for a specified cycle duration of the delayed first clock signal;
a second disable signal generating circuit that generates the second disable signal by delaying the first clock control signal for a specified cycle duration of the delayed second clock signal.

34. A method of selecting and outputting one of a first clock signal and a second clock signal comprising:
generating a first clock control signal based on a control signal and at least one of a first disable signal, the first clock signal and a second clock control signal;
generating a first gated clock signal based on the first clock control signal and a delayed first clock signal;
generating the second clock control signal based on an inverted control signal and at least one of a second disable signal, the second clock signal and the first clock control signal;
generating a second gated clock signal based on the second clock control signal and a delayed second clock signal;
generating the first disable signal by delaying the second clock control signal for a specified cycle duration of the delayed first clock signal;
generating the second disable signal by delaying the first clock control signal for a specified cycle duration of the delayed second clock signal; and
performing a logic operation on the first and second gated clock signals; and generating an output clock signal based on said logic operation.

35. The method of claim 34, wherein performing said logic operation includes performing a NAND operation.

36. A digital processing system, comprising:
a first clock signal source;
a second clock signal source;
a digital processing circuit operating with at least one of said first clock signal source and said second clock signal source; and
a clock selection circuit receiving the first and second clock signals from the first and second clock signal sources, selecting one of said first and second clock signals, and outputting the selected clock signal to the digital processing circuit, wherein said clock selection circuit receives a control signal and generates two gated clock signals based on the control signal and an inverted control signal, and wherein the clock selection circuit further generates a first disable signal by delaying a second clock control signal for a specified cycle duration of a delayed first clock signal and generates a second disable signal by delaying a first clock control signal for a specified cycle duration of a delayed second clock signal.

* * * * *